(12) United States Patent
Velusamy (10) Patent No.: US 8,713,029 B2
(45) Date of Patent: Apr. 29, 2014

(54) METHOD AND APPARATUS FOR PROVIDING AUTO-COMPLETION OF INFORMATION

(75) Inventor: Umashankar Velusamy, Tampa, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 741 days.

(21) Appl. No.: 11/935,216

(22) Filed: Nov. 5, 2007

(65) Prior Publication Data

US 2009/0119575 A1    May 7, 2009

(51) Int. Cl.
*G06F 17/30* (2006.01)

(52) U.S. Cl.
USPC .......................................... 707/749; 715/226

(58) Field of Classification Search
None
See application file for complete search history.

(56) References Cited

U.S. PATENT DOCUMENTS

| | | | |
|---|---|---|---|
| 6,765,554 B2 * | 7/2004 | Millington | 345/156 |
| 6,947,988 B1 * | 9/2005 | Saleh | 709/226 |
| 6,985,926 B1 * | 1/2006 | Ferlauto et al. | 709/206 |
| 7,185,271 B2 * | 2/2007 | Lee et al. | 715/226 |
| 7,254,569 B2 * | 8/2007 | Goodman et al. | 1/1 |
| 7,664,695 B2 * | 2/2010 | Cutler | 705/37 |
| 7,720,674 B2 * | 5/2010 | Kaiser et al. | 704/9 |
| 7,743,048 B2 * | 6/2010 | Baldwin | 707/713 |
| 2002/0152081 A1 * | 10/2002 | Kitamura et al. | 704/277 |
| 2003/0188262 A1 * | 10/2003 | Maxwell et al. | 715/507 |
| 2004/0076279 A1 * | 4/2004 | Taschereau | 379/218.01 |
| 2007/0033089 A1 * | 2/2007 | Dharmarajan et al. | 705/9 |
| 2007/0121803 A1 * | 5/2007 | Koepke et al. | 379/37 |
| 2008/0037733 A1 * | 2/2008 | Chen et al. | 379/88.22 |
| 2008/0104127 A1 * | 5/2008 | Billmaier et al. | 707/200 |
| 2009/0007252 A1 * | 1/2009 | Burckart et al. | 726/12 |
| 2009/0265340 A1 * | 10/2009 | Barcklay et al. | 707/5 |

* cited by examiner

*Primary Examiner* — Neveen Abel Jalil
*Assistant Examiner* — Kellye Buckingham (57) ABSTRACT

An approach is provided for auto-completion functions. Textual input is received from a user via an application, a profile metadata is retrieved based on the textual input, a script is generated based on the profile metadata, and the script is transmitted to the application, wherein the script provides auto-completion of information corresponding to the textual input using the profile metadata.

22 Claims, 5 Drawing Sheets

METHOD AND APPARATUS FOR PROVIDING AUTO-COMPLETION OF INFORMATION

BACKGROUND INFORMATION

The advent of global communication networks (e.g., the Internet) has served as a catalyst for the ubiquity of digital computing devices, as well as the inauguration of increasingly more data-centric applications, such as web-based entry forms and questionnaires including multiple input fields. In addition to enabling businesses, such as service providers, to collect vast amounts of consumer data, these applications also enable information to be efficiently stored and passed between one or more end-points. As such, when customers "sign up" for new services or participate in surveys "online," service providers generally require consumers to repeatedly enter large quantities of information, such as mundane personal information, e.g., name, address, telephone number, etc. Generally, the amount of time taken by a customer to input this information is directly proportional the nature of the information being requested, and the accuracy with which a customer enters the data. Accordingly, data entry often becomes trite, and rather burdensome. It is not surprising then that the automated software industry is becoming a critical and ever growing market segment. Even still, advances in technology, services, and affordability can be better applied to foster the accuracy, interactivity, and speed with which automating software performs.

Therefore, there is a need for an approach that seamlessly provides robust techniques for efficient, automatic, and accurate completion of information.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and software for providing auto-completion of information are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Figure 1:
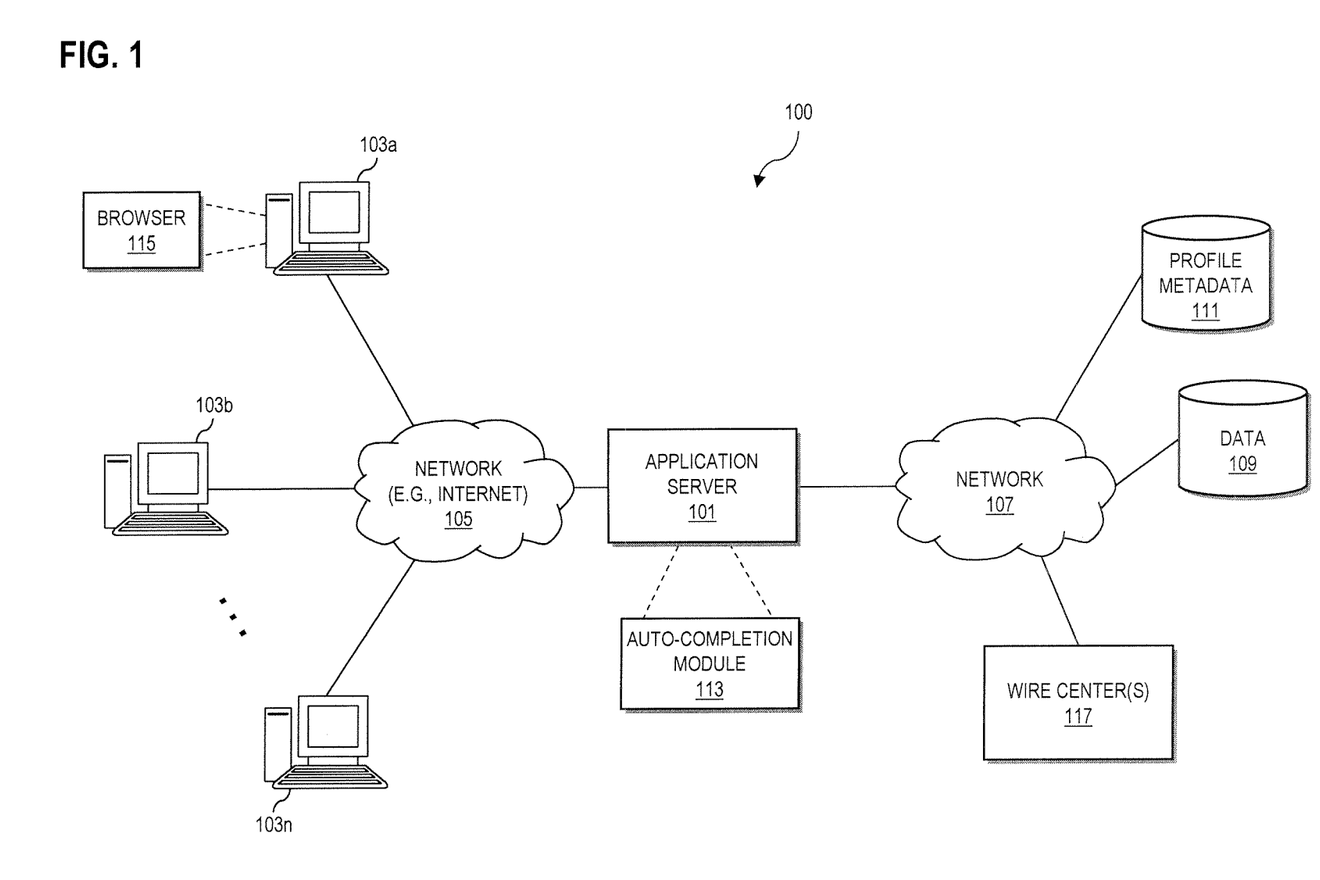
FIG. 1 is a diagram of a system capable of providing auto-completion of information, according to an exemplary embodiment.

FIG. 1 is a diagram of a system capable of providing auto-completion of information, according to an exemplary embodiment. For the purposes of illustration, a system 100 for providing auto-completion features is described with respect to a distributed client/server architecture of a service provider, such as a data, voice, and/or video carrier. While specific reference will be made thereto, it is to be appreciated that embodiments of system 100 may be provided having other architectures and/or environments (e.g., peer-to-peer).

It is noted that address validation is typically one of the first operations that businesses dealing with consumers perform. Within "online" environments, consumers and/or customer service representatives generally input addressing information into web-based applications, such as web-browsers. Conventional web-browsers, however, are generally made "thin," i.e., typically focus primarily on conveying input and output between a user and a server. As such, entering information into these interfaces usually requires a user to manually input the entirety of an input parameter. New classes of web-browsers, including "rich" internet applications, may provide auto-complete functions; however, these applications generally require previous entries to be "remembered" before the auto-completion features are made available. While useful, these auto-completions are limited to previously acknowledged information, and therefore, are unavailable for "first-time" entries. Thus, it is apparent that improvements are needed.

As shown, system 100 includes an application server 101 accessible to one or more client devices 103a-103n via, for example, network 105, e.g., the Internet. Application server 101 may access, as well as provide access to, one or more repositories of network 107, such as databases 109 and 111. In this manner, application server 101 includes an auto-completion module 113 configured to facilitate data entry in applications, such as a browser application 115, executing on a client device, such as client device 103a. According to one embodiment, browser application 115 provides information gathering functions for (or related to) customer service procedures of a telecommunications service providers. For example, the information can relate to one or more wire centers 117. It is contemplated, however, that system 100 may embody many forms and include multiple and/or alternative components and facilities.

According to one embodiment, textual input fields are provided by browser application 115 for users (e.g., customers/customer service representatives) at client devices 103a-103n to enter data, i.e., textual information. Textual information may include any type of data related to the processes of application 115, but more specifically may include textual information, such as: demographic information (e.g., names, gender, race, occupation, etc.), addressing information (e.g., street, city, state, zip code, etc.), credentials information (e.g., social security numbers, credit card numbers, telephone numbers, user names, passwords, etc.), business information (e.g., wire center names, trouble ticket codes, purchasing data, medical data, recruitment data, etc.), and financial information (e.g., bank account numbers, routing numbers, etc.), as well as any other suitable textual input. As such, application server 101 is configured to receive textual input from a user to generate one or more scripts, which provide client devices 103a-103n, e.g., browser applications 115, with auto-completion functions, even when the user is entering the information for the "first-time." That is, scripts may be custom built based on the input of a user, and implemented to predict and auto-complete the rest of the data "to be input" using pre-built profiles describing the data. Thus, certain embodiments of system 100 stem from the recognition that users can benefit from more flexible, robust methods of auto-completion that are driven based on the incremental input of the users, and operate so as to reduce the number of "keystrokes" (or other input means) the user must perform.

As seen in FIG. 1, components at, and included within, system 100 are connected to one or more networks (e.g., network 105 and/or network 107). These networks may include any type of network, such as, for example, a public data network (e.g., the Internet), various intranets, local area networks (LAN), wide area networks (WAN), the public switched telephony network (PSTN), integrated services digital networks (ISDN), other private packet switched networks or telephony networks, as well as any additional equivalent system or combination thereof. Networks 105 and 107 may employ various access technologies, such as: cable networks, satellite networks, subscriber television networks, digital subscriber line (DSL) networks, optical fiber networks, hybrid fiber-coax networks, worldwide interoperability for microwave access (WiMAX) networks, wireless fidelity (WiFi) networks, other wireless networks (e.g., 3G wireless broadband networks, mobile television networks, radio networks, etc.), terrestrial broadcasting networks, provider specific networks (e.g., Verizon® FiOS® network), and the like. As such, networks 105 and 107 may utilize any suitable protocol supportive of data communications, e.g., transmission control protocols (TCP), internet protocols (IP), user datagram protocols (UDP), remote desktop protocol (RDP), hypertext markup languages (HTML), dynamic HTML (DHTML), simple object access protocol (SOAP), file transfer protocols (FTP), telnet, hypertext transfer protocols (HTTP), asynchronous transfer mode (ATM), wireless application protocols (WAP), socket connections (e.g., secure sockets layer (SSL)), Ethernet, frame relay, and the like, to logically connect the various components of system 100.

Accordingly, client devices 103a-103n, upon which various embodiments may be executed, can include, for example, any computing, telephony, or mobile apparatus capable of sending and/or receiving data. Computing devices may include desktop computers, notebook computers, servers, terminal workstations, console gaming systems, multi-processor systems, microprocessor-based or programmable consumer electronics, minicomputers, mainframe computers, customized hardware, or other equivalent apparatus. Telephony devices may comprise plain-old-telephones, wireless telephones, cellular telephones, satellite telephones, voice over internet protocol telephones, and the like. Mobile devices may include personal digital assistants (PDA), pocket personal computers, smart phones, tablets, handsets, portable gaming systems, pagers, and customized hardware, as well as any other suitable mobile technology. Moreover, client devices 103a-103n may be used alone or in combination with one another to implement various exemplary embodiments.

Databases 109 and 111 may be multi-dimensional, analytical processing, and/or any other suitable database for storing business intelligence, such as the informational forms previously delineated. As such, communication between database 109, database 111, and application server 101, may be accomplished via one or more application programming interfaces (API) supporting one or more query languages, such as common query language (CQL), extensible markup language (XML) path language, object query language (OQL), and/or structured query language (SQL), as well as any other suitable language. According to one embodiment, data stored in (or to) databases 109 and 111 is structured or compartmentalizes into fields, tables, or any other suitable data structure, such as delimited text files. For example, addressing information may be stored to database 109 having a data structure including columns and rows corresponding to particular data fields and data entries, respectively. The data structure may be propagated with data entries corresponding to the addressing information for the purpose of forming scripts and/or auto-complete functions. It is noted that the aforementioned data structures are merely exemplary and are not intended to limit the nature or structure of databases 109 and 111. The various components of addressing information are explained in more detail according to FIG. 2.

Figure 2:
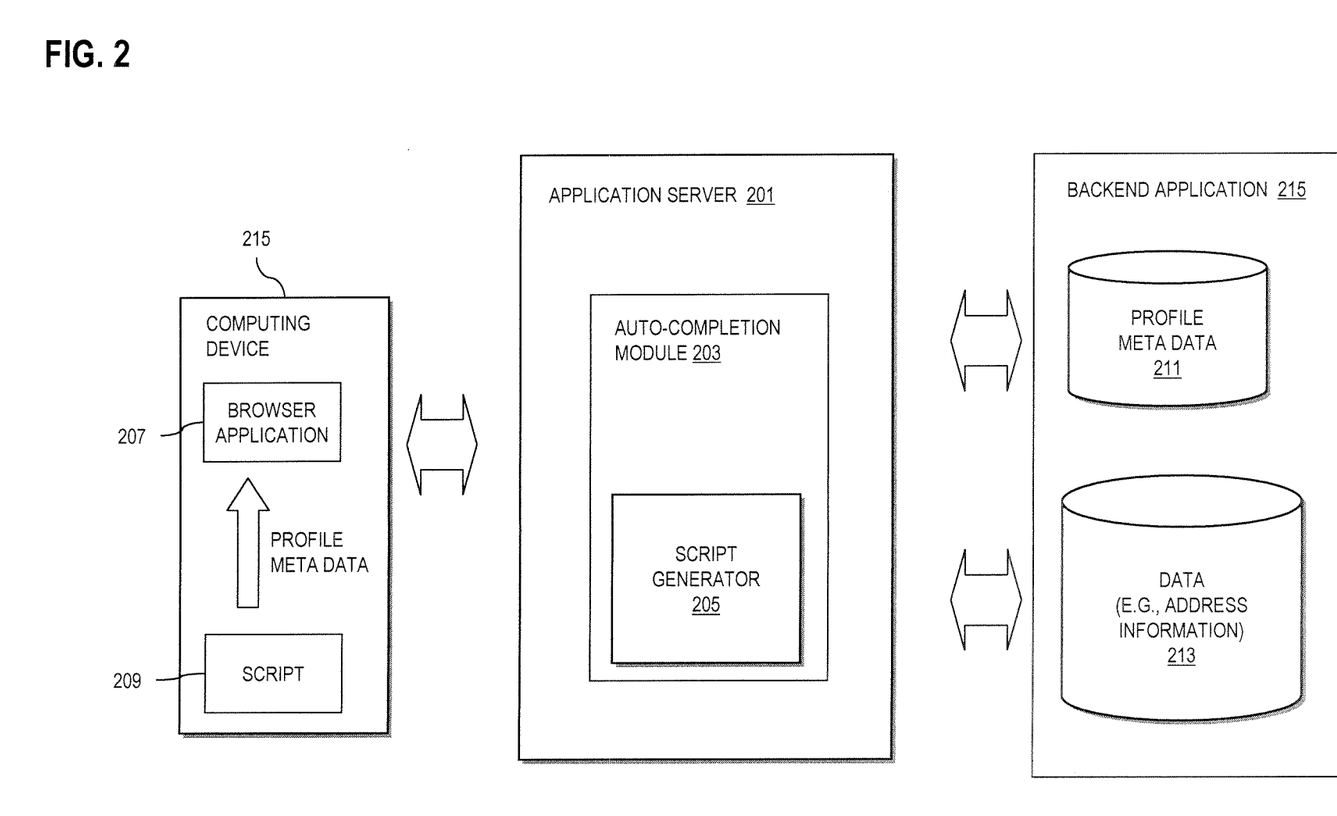
FIG. 2 is a diagram of an application server employing a script generator to provide profile metadata, according to an exemplary embodiment.

FIG. 2 is a diagram of an application server employing a script generator to provide profile metadata, according to an exemplary embodiment. The auto-completion process can be applied to any data input requirement. This process, according to certain embodiments, obtains part of the data that the customer would input and utilizes such input to predict and auto-complete the rest of the data in real-time using pre-built profiles. In the example of FIG. 2, an application server 201 provides an auto-completion module 203 that utilizes a script generator 205 to permit a user application, such as a browser application 207, using a generated script 209, to retrieve profile metadata stored within a profile metadata database 211. Additionally, the user application, via generated script 209, may retrieve supporting data, such as the actual data upon which the profile metadata are generated. The actual data can be stored within a database 213. These databases 211 and 213 can be separately provided—e.g., different memories or database systems; alternatively, the databases 211 and 213 can be a single standalone system.

For the purposes of illustration, the auto-completion module 203 operates to auto-complete address information. Accordingly, a profile can contain information such as the number of streets present and/or information regarding the directional prefixes in the streets.

As mentioned, address validation is one of the first operations that companies which directly deal with customers perform. The address could be entered directly by a customer (such as in a website) or by a customer service representative, who would get the address from the customer and input the information into a software application. In either instance, however, these individuals may utilize a browser application, e.g., browser application 207, to input the information. This process can be time consuming, depending on the address itself, the communication between the representative and the customer, and the accuracy of the data entered. Table 1 enumerates exemplary address information.

TABLE 1

House Number Prefix
House Number
House Number Suffix
Street Directional Prefix
Street Name
Street Directional Suffix
Thoroughfare
City
State
Zip Code.

In this manner, an exemplary address may be provided as follows: 1 E Telecom Parkway SW, Temple Terrace, Fla.—33617. It is noted that software applications (e.g., application 207) that perform address validation might require the address to be input as individual address components listed above, or as a complete string, or as a combination of both address components and strings. To automate the address input process, part of the address first may be obtained and then used to determine/predict the rest of the address, thereby reducing the number of keystrokes performed the user (e.g., customer service representative), as well as the possibility of mismatches and/or typographical errors.

For example, a user may seek to enter the address, "1 E Telecom Parkway SW, Temple Terrace, Fla.—33617." In this case, the user may be prompted by browser application 207 to input the zip code and/or city first. In the event there is only one city in the zip code, the user may not be prompted to enter the city name. In the event that there is more than one city associated to the zip code, the user may be prompted to choose one of the cities before proceeding. Once input, the street name "E Telecom Parkway SW" may be automatically completed if 33617+Temple Terrace only includes one street: "E Telecom Parkway SW." If, however, two streets exist, "E Telecom Parkway SW" and "W Telecom Parkway SW," then the street name may be auto-completed as soon as the customer types "E" or "W," or the streets may be provided within a drop list of selectable entries for the user to choose from. Accordingly, the process of data entry may be automated, even for "first time" entries. In the above examples, the profile metadata built for 33617+Temple Terrace would indicate that there is only one or two streets and hence the auto-completion module would proceed to retrieve the actual street names and send it to the browser application 115. However, if the profile metadata indicates that there are more than, for example, 100 streets in Temple Terrace+33617, the auto-completion module would proceed to retrieve other profile metadata (examples listed below, such as total number of streets with prefixes), and to generate a script using the profile metadata. The auto-completion module may send the script 209 or the profile metadata or both, to the application 115. In some cases, the profile metadata may be embedded in the script 209 as well. The script 209 may also contain custom built information, using the profile metadata or the data or both, which might aid in auto-completion or recognizing a precise moment for auto-completion. According to one embodiment, the script 209, when run in the application 115, can continuously process the textual input by the user, recognize various components of the data input by the user and use them to detect the moment at which a query can be submitted to a backend application 215 for successful auto-completion (using the least amount of data exchange between the browser 115 and the backend application 215, using the least number of key strokes).

Further, the address information categories of Table 1 may also be utilized for storage purposes. That is, the categories may be made to correspond to elements of a multidimensional, relational table of database 213, wherein actual address information is parsed into its individual components and stored according to one or more zip code and/or community (city name) combinations. The relational table may include one or more rows and/or columns, wherein individual rows may be utilized to correspond to complete address entries, while individual columns may be utilized to correspond to the various address information components. Such architecture enables application server 201, for instance, to efficiently acquire necessary information from database 213. It is contemplated, however, that any other storage scheme may be utilized, such as a hierarchical model, network model, etc., as well as combinations thereof.

According to one embodiment, a profile metadata can be built based on the data stored in database 213. That is, profile metadata can be structured and encoded to correspond to particular zip code and community (city name) combinations. The information built in the profile metadata may be utilized to assist with auto-completing the address input to a input field of an application (e.g., application 207) by the user. It is noted that metadata is generally considered data about data; but more specifically, metadata can be utilized to describe all aspects of, and data distributed through, system 100. In this manner, profile metadata provides a deeper understanding of the information, quality, and structure of the data as it resides in, for example, an underlying database. As such, profile metadata may be generated, and periodically updated, by a computing device, such as a back-server (not illustrated) of network 107. Namely, the actual data upon which profile metadata is constructed may be retrieved from database 213 and analyzed by the computing device to structure and encode profile metadata. According to certain embodiments, profile metadata includes statistics and information about the underlying data which may be utilized to determine uses of the actual data, provide metrics on data quality, assess whether data may be integrated into an application, and create an enterprise view of the data, as well as any other suitable use. Thus, components of system 100 may utilize generated metadata for control, guiding, and/or data entry purposes, such as for auto-completion purposes.

In an exemplary embodiment, Table 2 provides the information built in the metadata profile for given community and zip code combinations:

TABLE 2

1. Total Number of Streets
2. Total Number of Streets with Directional Prefix
3. Total Number of Streets with Directional Suffix
4. Total Number of Streets with Thoroughfare
5. Number of streets with the combinations of 2,3,4 and the numbers without the items discussed
6. Nature of the street number ranges (Odd/Even/Numeric/Alphanumeric)
7. Whether any of the streets have the same name as the directional prefixes
8. The actual elements, if the number is less
9. Alphabetical weightage on street names According to certain embodiments, the profile metadata information (e.g., total number of streets, and total number of streets with directional prefix) can be utilized in a variety of ways. In the case of the total number of streets, if a zip code/community combination has only one street, then the street can be completely auto-populated the moment the customer finalizes a community and zip code input. Namely, it will not be necessary to wait for the user to start typing the street name to populate a corresponding input field(s). Also, if a particular zip code and community combination includes a predetermined number of values (e.g., 10 streets), all the 10 streets may be displayed upfront for the user to select from, which can be provided even before the user begins to type anything. This may be accomplished via, for example, a drop down list of selectable entries.

As for the total number of streets with a directional prefix, if none of the streets have directional prefixes, the recognition of the street name is simplified. In such case, it can be assumed that what the user inputs (e.g., types) is part of the street name. If there is only one directional prefix for the entire zip/community combination, then any textual input other than that directional prefix can be assumed to be a part of the street name.

Figure 5:
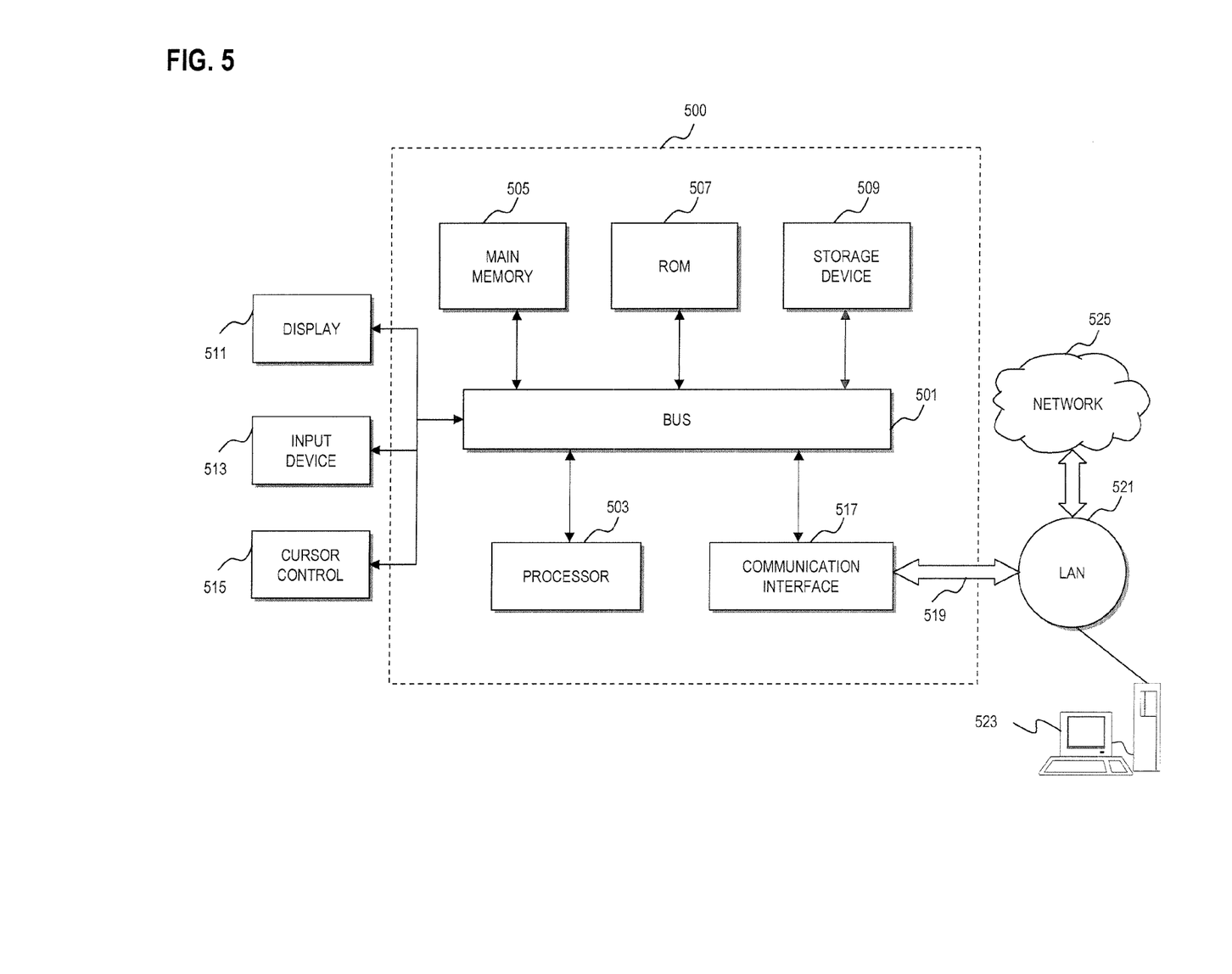
FIG. 5 is a diagram of a computer system that can be used to implement various exemplary embodiments.

In this example, the browser application 207 resides within a computing device 215, which may include desktop computers, notebook computers, pocket personal computers, servers, terminal workstations, personal digital assistants (PDA), smart phones, tablets, handsets, gaming systems, customized hardware, or other equivalent apparatus, such as the computing hardware described with respect to FIG. 5.

Figure 3:
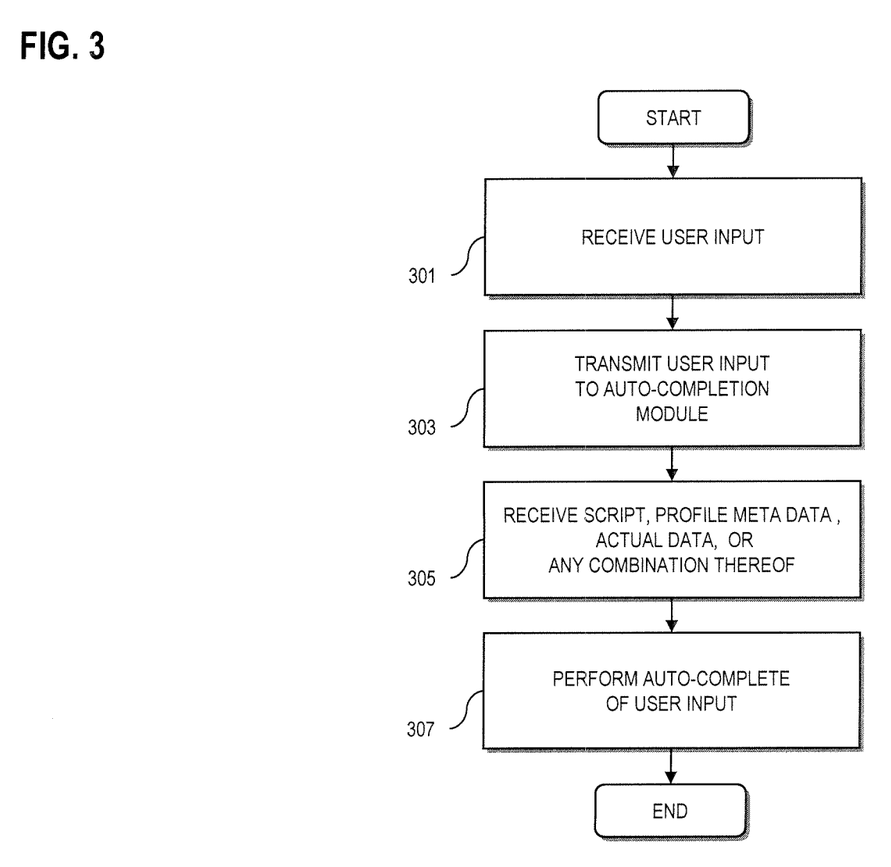
FIG. 3 is a flowchart of an auto-completion process performed at a user application, according to an exemplary embodiment.

The operation of auto-completion module 203 is now explained with respect to FIG. 3.

FIG. 3 is a flowchart of an auto-completion process performed at a user application, according to an exemplary embodiment. Initially, part of the information that the user inputs to browser application 207 is obtained, such a zip code and community combination. This information is then used to generate script commands, as well as predict and autocomplete the remaining information, such as a street name. Continuing with the example of FIG. 2, in step 301, a user enters textual input (e.g., part of an address) to the browser application 207. At this point, the computing device 215 transmits the textual input to the auto-completion module 203 within the application server 201, as in step 303. The auto-completion module 203 invokes a script generator 205 to output a script; additionally, the auto-completion module 203 accesses the profile metadata database 211 to retrieve a profile metadata corresponding to the textual input.

In general, the purpose of the profile metadata is to recognize the possibility of auto-completion instantaneously. The actual data, associated profile metadata by itself, or supporting data (wherein the data is of a manageable size) and can be sent to the computing device 215 for auto-completion; alternatively, any one of such data can aid in the generation of a client side script, which when run in the computing device 215, can be used for auto-completion either by using the data/metadata or by initiating a transaction to a backend application or processor (not shown) at the appropriate moment to provide the necessary information for auto-completion. The profile metadata, thus, is useful in auto-completion using the least amount of keystrokes, while at the same time minimizing the data exchange between the browser 207 and the backend application for auto-completion.

In step 305, the browser application 207 may receive the script, the profile metadata, the actual data (or any combination thereof) for auto-completion of the information. That is, the profile metadata itself or the actual data can be used to auto-complete the information; in such a case, the script may not be generated at all. However, in the case in which a script is needed, upon receipt of the script, the browser application 207 can execute the script to perform auto-completion of the information that the user has input (e.g., typed), as in step 307. According to particular embodiments, browser application 207 may also be provided, via application server 201, with all (or portions of) the actual data utilized to construct the profile metadata. In one implementation, generated scripts are constructed to include, apart from auto-completion commands, the metadata and/or the actual data corresponding to the zip code and community combination input by the user to browser application 207.

Figure 4:
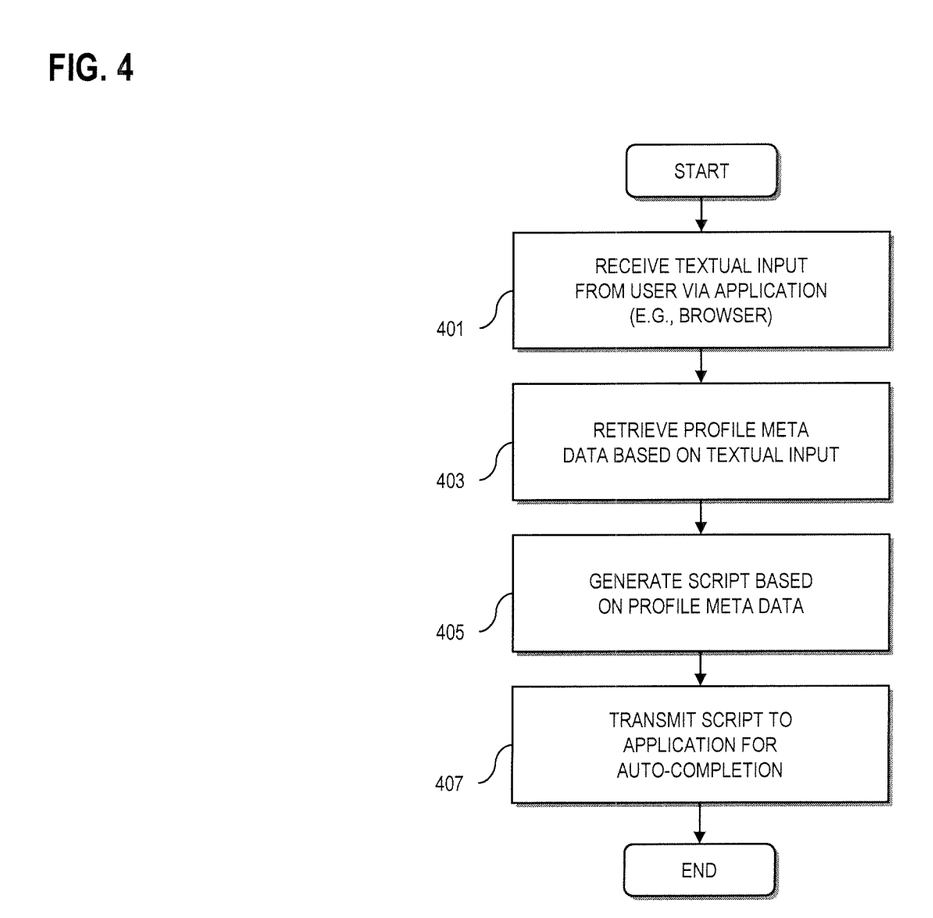
FIG. 4 is a flowchart of a process for generating a script to provide auto-completion of information, according to an exemplary embodiment.

FIG. 4 is a flowchart of a process for generating a script to provide auto-completion of information, according to an exemplary embodiment. As explained above, the textual input from the user is received via browser application 207 by the auto-completion module 203, per step 401. Next, the auto-completion module 203 retrieves the profile metadata based on the textual input, as in step 403. In step 405, the script generator 205 produces a script based on the profile metadata. Thereafter, the script along with the retrieved profile metadata are transmitted to the computing device 215 for auto-completing the user's input (step 407). It is noted that since scripts are executed directly from their source code, which generally comprises text files of commands, browser application 207 is able to quickly execute auto-completion commands, as traditional edit-compile-link run processes are shortened, if not eliminated. Thus, generated scripts allow for efficient automation of repetitive tasks, such as data entry and auto-completion functions.

The above processes are now illustrated with respect to addressing information. In an address validation scenario, as performed using the browser application 207 of FIG. 2, the auto-completion operation is as follows. The user inputs a part of the address information, such as zip code and community parameters. The request is sent to application server 201, which retrieves the profile metadata for the input combination of zip code and community. The application server 201 then generates a customized client side script 209, based on the profile metadata and, in certain instances, supporting data retrieved from the database 213. Application server 201 then sends the script to the browser application 207. The client side script 209, via browser application 207, processes the inputs from the user to aid the user in auto-completing the information, and if necessary by using supporting data. The supporting data, for example, may be actual street names, house numbers, etc. The client side script 209 can also initiate a transaction to the backend application 215 to retrieve data which will aid in auto-completion of customer input.

It is noted that conventionally browsers have been provided with a mechanism to "remember" previous entries and auto-complete the same when the user tries reenter the data. However, for this mechanism to operate, the user must have entered the data already and such data must have been stored locally in, for instance, a memory of an executing computing device. By contrast, the auto-completion module 203 provides auto-completion functions to software applications, such as browser applications, even when the user is inputting the data for the first time, i.e., no locally stored information, and does not require any information to be stored on the local computing device.

The processes described herein for providing auto-completion of information may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

FIG. 5 illustrates computing hardware (e.g., computer system) 500 upon which an embodiment according to the invention can be implemented. The computer system 500 includes a bus 501 or other communication mechanism for communicating information and a processor 503 coupled to the bus 501 for processing information. The computer system 500 also includes main memory 505, such as a random access memory (RAM) or other dynamic storage device, coupled to the bus 501 for storing information and instructions to be executed by the processor 503. Main memory 505 can also be used for storing temporary variables or other intermediate information during execution of instructions by the processor 503. The computer system 500 may further include a read only memory (ROM) 507 or other static storage device coupled to the bus 501 for storing static information and instructions for the processor 503. A storage device 509, such as a magnetic disk or optical disk, is coupled to the bus 501 for persistently storing information and instructions.

The computer system 500 may be coupled via the bus 501 to a display 511, such as a cathode ray tube (CRT), liquid crystal display, active matrix display, or plasma display, for displaying information to a computer user. An input device 513, such as a keyboard including alphanumeric and other keys, is coupled to the bus 501 for communicating information and command selections to the processor 503. Another type of user input device is a cursor control 515, such as a mouse, a trackball, or cursor direction keys, for communicating direction information and command selections to the processor 503 and for controlling cursor movement on the display 511.

According to an embodiment of the invention, the processes described herein are performed by the computer system 500, in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multi-processing arrangement may also be employed to execute the instructions contained in main memory 505. In alternative embodiments, hard-wired circuitry may be used in place of or in combination with software instructions to implement the embodiment of the invention. Thus, embodiments of the invention are not limited to any specific combination of hardware circuitry and software.

The computer system 500 also includes a communication interface 517 coupled to bus 501. The communication interface 517 provides a two-way data communication coupling to a network link 519 connected to a local network 521. For example, the communication interface 517 may be a digital subscriber line (DSL) card or modem, an integrated services digital network (ISDN) card, a cable modem, a telephone modem, or any other communication interface to provide a data communication connection to a corresponding type of communication line. As another example, communication interface 517 may be a local area network (LAN) card (e.g. for Ethernet™ or an Asynchronous Transfer Model (ATM) network) to provide a data communication connection to a compatible LAN. Wireless links can also be implemented. In any such implementation, communication interface 517 sends and receives electrical, electromagnetic, or optical signals that carry digital data streams representing various types of information. Further, the communication interface 517 can include peripheral interface devices, such as a Universal Serial Bus (USB) interface, a PCMCIA (Personal Computer Memory Card International Association) interface, etc. Although a single communication interface 517 is depicted in FIG. 5, multiple communication interfaces can also be employed.

The network link 519 typically provides data communication through one or more networks to other data devices. For example, the network link 519 may provide a connection through local network 521 to a host computer 523, which has connectivity to a network 525 (e.g. a wide area network (WAN) or the global packet data communication network now commonly referred to as the "Internet") or to data equipment operated by a service provider. The local network 521 and the network 525 both use electrical, electromagnetic, or optical signals to convey information and instructions. The signals through the various networks and the signals on the network link 519 and through the communication interface 517, which communicate digital data with the computer system 500, are exemplary forms of carrier waves bearing the information and instructions.

The computer system 500 can send messages and receive data, including program code, through the network(s), the network link 519, and the communication interface 517. In the Internet example, a server (not shown) might transmit requested code belonging to an application program for implementing an embodiment of the invention through the network 525, the local network 521 and the communication interface 517. The processor 503 may execute the transmitted code while being received and/or store the code in the storage device 509, or other non-volatile storage for later execution. In this manner, the computer system 500 may obtain application code in the form of a carrier wave.

The term "computer-readable medium" as used herein refers to any medium that participates in providing instructions to the processor 503 for execution. Such a medium may take many forms, including but not limited to non-volatile media, volatile media, and transmission media. Non-volatile media include, for example, optical or magnetic disks, such as the storage device 509. Volatile media include dynamic memory, such as main memory 505. Transmission media include coaxial cables, copper wire and fiber optics, including the wires that comprise the bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While the invention has been described in connection with a number of embodiments and implementations, the invention is not so limited but covers various obvious modifications and equivalent arrangements.

What is claimed is:

1. A method for displaying geographic address element candidates at a user device, comprising:
   receiving a textual input from a user via an application;
   retrieving a profile metadata based on the textual input, wherein the profile metadata is generated based on data that is independent from the user, the profile metadata includes a total number of geographic street candidates in a first category and a total number of geographic street element candidates in a second category associated with the textual input, the geographic street element candidates are street attributes other than street candidates, and each of the total number is a positive integer greater than one; and
   generating a script based on the profile metadata for transmission of the script to the application, wherein the script is generated using the total number of the geographic street candidates in the first category when the total number of the geographic street candidates is less than or equal to a predetermined threshold that is a positive integer, and the script is generated using the geographic street element candidates in the second category when the total number of the geographic street candidates in the first category is more than the predetermined threshold, and the script executes auto-completion of information corresponding to the textual input using at least one of the geographic street element candidates in the second category to display the geographic address element candidates at the user device, wherein the textual input specifies geographic addressing information other than a geographic address element corresponding to the geographic address element candidates, and the script executes the auto-completion by displaying the geographic address element candidates prior to the user inputs any portion of the geographic address element.

2. The method according to claim 1, wherein the textual input specifies a portion of geographic addressing information, and the information that is auto-completed is a remaining portion of the geographic addressing information.

3. The method according to claim 1, wherein the geographic street element candidates in the second category include a plurality of street directional prefix candidates, a plurality of street directional suffix candidates, a plurality of street thoroughfare candidates, a plurality of street directional prefix and suffix candidates, a plurality of street directional prefix and thoroughfare candidates, or a plurality of street directional prefix, suffix, and thoroughfare candidates.

4. The method according to claim 1, wherein the application is a browser application.

5. The method according to claim 1, wherein the textual input is provided to the application for a telecommunications service, and the information includes name of a wire center, the user being a customer representative or a subscriber.

6. The method according to claim 3, wherein the profile metadata is used to auto-complete the information, and
when the script determines that none of the geographic street candidates has a directional prefix, the script treats the textual input as a part of a street name, and when the script determines that only one of the geographic street candidates has a directional prefix, the script treats the textual input other than the directional prefix as a part of the street name.

7. An apparatus for displaying geographic address element candidates at a user device, comprising:
a communication interface configured to retrieve a profile metadata based on the textual input, wherein the profile metadata is generated based on data that is independent from the user, the profile metadata includes a total number of geographic street candidates in a first category and a total number of geographic street element candidates in a second category associated with the textual input, the geographic street element candidates are street attributes other than street candidates, and each of the total number is a positive integer greater than one; and
a processor configured to generate a script based on the profile metadata for transmission of the script to the application,
wherein the script is generated using the total number of the geographic street candidates in the first category when the total number of the geographic street candidates is less than or equal to a predetermined threshold that is a positive integer, and the script is generated using the geographic street element candidates in the second category when the total number of the geographic street candidates in the first category is more than the predetermined threshold, and the script executes auto-completion of information corresponding to the textual input using at least one of the geographic street element candidates in the second category to display the geographic address element candidates at the user device, wherein the textual input specifies geographic addressing information other than a geographic address element corresponding to the geographic address element candidates, and the script executes the auto-completion by displaying the geographic address element candidates prior to the user inputs any portion of the geographic address element.

8. The apparatus according to claim 7, wherein the textual input specifies a portion of geographic addressing information, and the information that is auto-completed is a remaining portion of the geographic addressing information.

9. The apparatus according to claim 7, wherein the geographic street element candidates in the second category include a plurality of street directional prefix candidates, a plurality of street directional suffix candidates, a plurality of street thoroughfare candidates, a plurality of street directional prefix and suffix candidates, a plurality of street directional prefix and thoroughfare candidates, or a plurality of street directional prefix, suffix, and thoroughfare candidates.

10. The apparatus according to claim 7, wherein the application is a browser application.

11. The apparatus according to claim 7, wherein the textual input is provided to the application for a telecommunications service, and the information includes name of a wire center, the user being a customer representative or a subscriber.

12. The apparatus according to claim 7, wherein the profile metadata is used to auto-complete the information.

13. A system for displaying geographic address element candidates at a user device, comprising:
an application server configured to receive a textual input from a user via a browser application; and
a database configured to store a profile metadata, which is retrieved by the application server based on the textual input, wherein the profile metadata is generated based on data that is independent from the user, the profile metadata includes a total number of geographic street candidates in a first category and a total number of geographic street element candidates in a second category associated with the textual input, the geographic street element candidates are street attributes other than street candidates, and each of the total number is a positive integer greater than one,
wherein the application server is further configured to generate a script based on the profile metadata for transmission of the script to the browser application,
wherein the script is generated using the total number of the geographic street candidates in the first category when the total number of the geographic street candidates is less than or equal to a predetermined threshold that is a positive integer, and the script is generated using the geographic street element candidates in the second category when the total number of the geographic street candidates in the first category is more than the predetermined threshold, and the script executes auto-completion of information corresponding to the textual input using at least one of the geographic street element candidates in the second category to display the geographic address element candidates at the user device, wherein the textual input specifies geographic addressing information other than a geographic address element corresponding to the geographic address element candidates, and the script executes the auto-completion by displaying the geographic address element candidates prior to the user inputs any portion of the geographic address element.

14. The system according to claim 13, wherein the textual input specifies a portion of geographic addressing information, and the information that is auto-completed is a remaining portion of the geographic addressing information.

15. The system according to claim 13, wherein the geographic street element candidates in the second category include a plurality of street directional prefix candidates, a plurality of street directional suffix candidates, a plurality of street thoroughfare candidates, a plurality of street directional prefix and suffix candidates, a plurality of street directional prefix and thoroughfare candidates, or a plurality of street directional prefix, suffix, and thoroughfare candidates.

16. The system according to claim 13, wherein the textual input is provided to the application for a telecommunications service, and the information includes name of a wire center, the user being a customer representative or a subscriber.

17. The system according to claim 13, wherein the browser application resides in a computing device that is configured to store the information for subsequent auto-completion of user inputs.

18. The system according to claim 13, wherein the browser application resides in a computing device, and the information was not previously locally stored in the computing device.

19. The apparatus according to claim 13, wherein the profile metadata is used to auto-complete the information.

20. The method according to claim 1, wherein the geographic address elements include a street, city, state, zip code, or a combination thereof, and the script is generated by an apparatus and transmitted to the user device via a public data network.

21. The method according to claim 20, wherein the apparatus is another user device.

22. The method according to claim 3, wherein the metadata profile further includes a nature of street number ranges, information specifying whether any of the streets have the same name as the directional prefixes, alphabetical weightage on the street names, or a combination thereof, that are used to reduce the total number of the geographic address element candidates displayed at the user device.

* * * * *